United States Patent
Yamamura

(10) Patent No.: US 9,136,525 B2
(45) Date of Patent: Sep. 15, 2015

(54) NEGATIVE-ELECTRODE ACTIVE MATERIAL, AND METHOD FOR PRODUCTION OF NEGATIVE-ELECTRODE ACTIVE MATERIAL

(75) Inventor: Hideyuki Yamamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 14/123,637

(22) PCT Filed: Jun. 19, 2012

(86) PCT No.: PCT/IB2012/001204
§ 371 (c)(1),
(2), (4) Date: Dec. 3, 2013

(87) PCT Pub. No.: WO2012/176039
PCT Pub. Date: Dec. 27, 2012

(65) Prior Publication Data
US 2014/0110639 A1    Apr. 24, 2014

(30) Foreign Application Priority Data

Jun. 24, 2011   (JP) .................................. 2011-140706

(51) Int. Cl.
| H01M 4/38 | (2006.01) |
| H01M 4/02 | (2006.01) |
| H01M 4/04 | (2006.01) |
| H01M 4/131 | (2010.01) |
| H01M 4/136 | (2010.01) |
| H01M 4/1391 | (2010.01) |
| H01M 4/1397 | (2010.01) |
| H01M 4/48 | (2010.01) |
| H01M 4/58 | (2010.01) |
| H01M 4/36 | (2006.01) |

(52) U.S. Cl.
CPC .............. *H01M 4/02* (2013.01); *H01M 4/0471* (2013.01); *H01M 4/131* (2013.01); *H01M 4/136* (2013.01); *H01M 4/1391* (2013.01); *H01M 4/1397* (2013.01); *H01M 4/364* (2013.01); *H01M 4/366* (2013.01); *H01M 4/38* (2013.01); *H01M 4/386* (2013.01); *H01M 4/483* (2013.01); *H01M 4/5825* (2013.01); H01M 4/36 (2013.01); H01M 4/381 (2013.01); H01M 2004/027 (2013.01); Y02E 60/122 (2013.01)

(58) Field of Classification Search
CPC ....... H01M 4/02; H01M 4/027; H01M 4/036; H01M 4/381; H01M 4/386
USPC ...................................... 252/182.1; 429/218.1
See application file for complete search history.

(56) References Cited

U.S. PATENT DOCUMENTS

| 5,395,711 | A | 3/1995 | Tahara et al. |
| 2008/0193831 | A1 | 8/2008 | Mah et al. |
| 2009/0075173 | A1 | 3/2009 | Jeong et al. |
| 2009/0162750 | A1 | 6/2009 | Kawakami et al. |
| 2010/0143804 | A1 | 6/2010 | Mah et al. |

FOREIGN PATENT DOCUMENTS

| JP | A-06-325765 | 11/1994 |
| JP | A-2004-349237 | 12/2004 |
| JP | A-2007-059213 | 3/2007 |
| JP | A-2008-198610 | 8/2008 |
| JP | A-2009-070825 | 4/2009 |
| JP | A-2009-164104 | 7/2009 |
| JP | A-2010-140901 | 6/2010 |
| JP | A-2010-170943 | 8/2010 |

OTHER PUBLICATIONS

Reduction effect of irreversible capacity on SiO anode material heat-reacted with Fe2O3, H. Yamamura et al., Journal of Power Sources 232, 2013, 264-269.*

* cited by examiner

Primary Examiner — Khanh Tuan Nguyen
Assistant Examiner — Haidung Nguyen
(74) Attorney, Agent, or Firm — Oliff PLC

(57) ABSTRACT

A negative-electrode active material characterized by containing a silicon oxide represented by a general formula $SiO_x$ (0<x<2) and a silicate compound represented by a composition formula $M_aSi_bO_c$-m(OH)-n(H_2O), and a method for the production of a negative-electrode active material which includes a mixing step of mixing a silicon oxide that is represented by a general formula $SiO_y$ (0<y<2) and a metal oxide, and a heat treatment step of performing a heat treatment on the mixture that is obtained in the mixing step in a non-oxidizing atmosphere and in which the negative absolute value of the standard Gibbs energy of the oxidation reaction of the metal oxide at the heating temperature in the heat treatment step is smaller than the negative absolute value of the standard Gibbs energy of the oxidation reaction of Si at the heating temperature in the heat treatment step.

18 Claims, 9 Drawing Sheets

F I G . 1
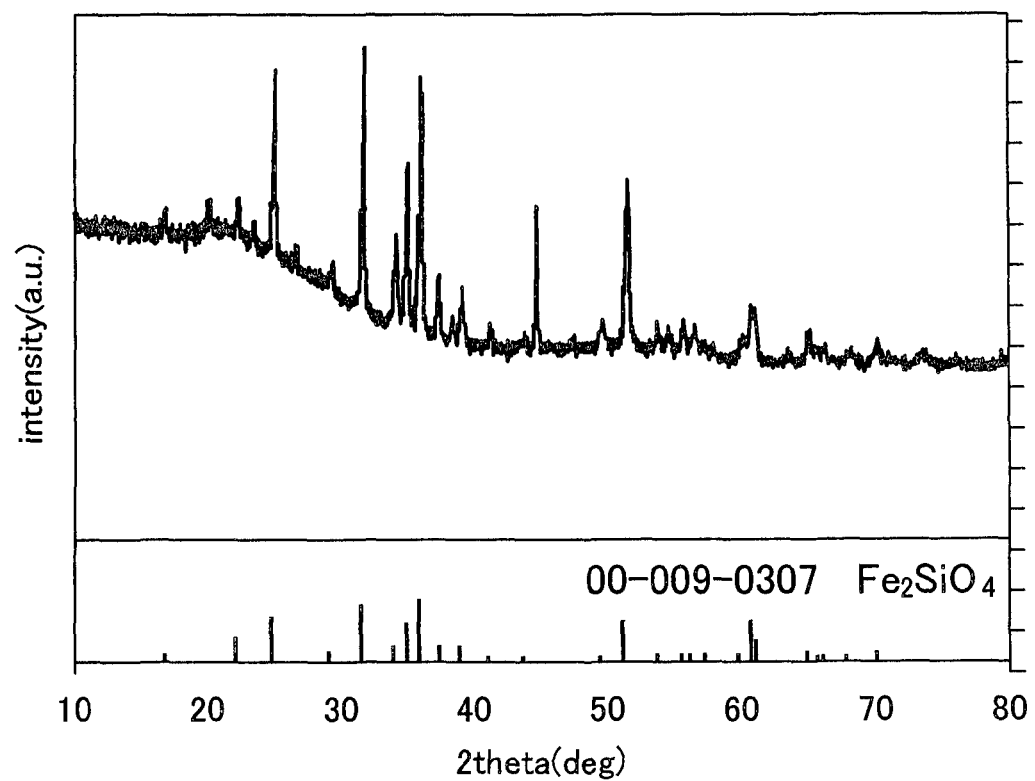

Fe COMPOUND IS PRESENT ON SURFACE OF SiO.

NEGATIVE-ELECTRODE ACTIVE MATERIAL, AND METHOD FOR PRODUCTION OF NEGATIVE-ELECTRODE ACTIVE MATERIAL

BACKGROUND OF THE INVENTION

1. Field of the Invention

The present invention relates to a negative-electrode active material, and a method for the production of a negative-electrode active material.

2. Description of Related Art

With the recent rapid spread of information and communication devices such as personal computers, video cameras and cellular phones, the development of batteries that are used as power sources for the devices is regarded as important. In the automotive industries, high-output and high-capacity batteries for electrical or hybrid vehicles are under development. Among various types of batteries, lithium batteries are attracting attention because of their high energy density and output.

A lithium battery usually includes a positive-electrode active material layer that contains a positive-electrode active material, a negative-electrode active material layer that contains a negative-electrode active material, and an electrolyte layer that is interposed between the electrode active material layers, and optionally includes a positive electrode current collector that collects current from the positive-electrode active material layer and a negative electrode current collector that collects current from the negative-electrode active material layer.

Well-known examples of the negative-electrode active material include carbon-based negative-electrode active materials and metal-based negative-electrode active materials. In general, metal-based negative-electrode active materials have an advantage of having a higher theoretical capacity than carbon-based negative-electrode active materials. On the other hand, the problems of metal-based negative-electrode active materials are that they significantly change in volume in response to insertion and extraction of lithium ions as conductive ions and tends to cause cracks in the negative-electrode active material layer or layers adjacent to the negative-electrode active material layer and flaking or powdering of the negative-electrode active material, and that they are poor in cycle characteristics. For example, the theoretical capacity of silicon (Si) is approximately 4200 mAh/g, which is more than ten, times that of carbon, which is approximately 372 mAh/g. Thus, studies are being conducted for a silicon-based negative-electrode active material that contains silicon which shows significant improvement in various properties such as cycle characteristics (for example, Japanese Patent Application Publication No. 6-325765 (JP 6-325765 A), Japanese Patent Application Publication No. 2008-198610 (JP 2008-198610 A), Japanese Patent Application Publication No. 2009-70825 (JP 2009-70825 A), Japanese Patent Application Publication No. 2010-140901 (JP 2010-140901 A), Japanese Patent Application Publication No. 2009-164104 (JP 2009-164104 A), Japanese Patent Application Publication No. 2004-349237 (JP 2004-349237 A)).

For example, JP 6-325765 A discloses a lithium secondary battery that uses a lithium-containing silicon oxide or silicate which can occlude and release lithium as a negative-electrode active material.

SUMMARY OF THE INVENTION

However, even when a negative-electrode active material as disclosed in JP 6-325765 A is used, the problem of low initial charge-discharge efficiency cannot be solved. It is also known that dispersion of particulate silicon in the $SiO_2$ matrix can mitigate the volume expansion accompanied by insertion and extraction of conductive ions. However, the present inventor found that a silicon oxide, such as $SiO_2$, allows reversible insertion and extraction of lithium ions but, on the other hand, undergoes an irreversibly reaction with lithium ions to form a lithium silicate. Such an irreversible reaction increases the irreversible capacity of the secondary battery, resulting in a decrease in charge-discharge efficiency.

The present invention provides a negative-electrode active material that contains a silicon oxide and allows the production of a secondary battery in which an irreversible reaction of the negative-electrode active material with conductive ions is prevented and which has a high charge-discharge efficiency and a high charge-discharge capacity, and a method for the production of the negative-electrode active material.

A first aspect of the present invention relates to a negative-electrode active material that contains a silicon oxide that is represented by a general formula $SiO_x$ ($0<x<2$), and a silicate compound that is represented by $M_aSi_bO_c \cdot m(OH) \cdot n(H_2O)$. The symbols a, b, c, m and n are respectively in the ranges of $0<a\leq7$, $0<b\leq8$, $0<c\leq22$, $0\leq m\leq4$ and $0\leq n\leq10$, M contains at least one of Group 3 to 12 transition metal elements in the long-form periodic table and may contain, in addition to the transition metal element, at least one of Group 1 alkali metal elements and Group 2 alkaline-earth metal elements, and Si may be partially substituted by at least one of Al and B.

The negative-electrode active material of the present invention has a high charge-discharge capacity that is derived from Si, and has high charge-discharge efficiency because it is prevented from undergoing an irreversible reaction with conductive ions (for example, lithium ions). In the general formula $SiO_x$, x is preferably in the range of $0.8 \leq x \leq 1.2$.

One example of the negative-electrode active material of the present invention is in the form in which at least one silicate compound phase that contains the silicate compound is present at least in a silicon oxide phase that contains the silicon oxide. More specifically, the negative-electrode active material of the present invention is in the form in which the silicate compound phase has a mean diameter of 10 to 2000 nm, for example.

One example of the negative-electrode active material of the present invention is in the form in which a silicate compound phase that contains the silicate compound is present at least on the surfaces of silicon oxide particles that contain the silicon oxide. More specifically, the negative-electrode active material of the present invention is in the form in which the silicate compound phase that is present on the surfaces of the silicon oxide particles has a thickness of 10 to 2000 nm.

A second aspect of the present invention relates to a method for the production of a negative-electrode active material that includes a mixing step of mixing a silicon oxide that is represented by a general formula $SiO_y$ ($0<y<2$) and a metal oxide, and a heat treatment step of performing a heat treatment on the mixture that is obtained in the mixing step in a non-oxidizing atmosphere. The negative absolute value of the standard Gibbs energy of the oxidation reaction of the metal oxide at the heating temperature in the heat treatment step is smaller than the negative absolute value of the standard Gibbs energy of the oxidation reaction of Si at the heating temperature in the heat treatment step.

According to the method for the production of a negative-electrode active material of the present invention, it is possible to synthesize a negative-electrode active material which contains a silicon oxide phase that contains a silicon oxide that is represented by a general formula $SiO_x$ ($0<x<2$) and a silicate compound phase that contains a silicate compound that is represented by the composition formula above.

In the general formula $SiO_y$, y is preferably in the range of $0.8 \leq y \leq 1.2$. The heat treatment is preferably carried out at a temperature of 600° C. to 1000° C. in an inert atmosphere in the heat treatment step. This is because the reaction between the silicon oxide and the metal oxide proceeds efficiently. The heat treatment is preferably carried out at a temperature of 700° C. to 900° C. in the heat treatment step. This is because a negative-electrode active material in which the silicate compound phase are present on the surfaces of silicon oxide particles can be synthesized efficiently.

In the mixing step, 0.001 to 0.2 mol of the metal oxide is preferably added per mol of the silicon oxide. This is because a negative-electrode active material which has high charge-discharge capacity and exhibits high charge-discharge efficiency can be synthesized efficiently.

In the mixing step, the metal oxide has an average particle size which is equal to or smaller than that of the silicon oxide. This is because a negative-electrode active material which exhibits excellent cycle characteristics can be synthesized.

In the mixing step, the metal oxide is preferably deposited on the surface of the silicon oxide. This is because a negative-electrode active material which has high charge-discharge capacity and exhibits high charge-discharge efficiency can be synthesized efficiently.

In the mixing step, the silicon oxide and the metal oxide are preferably mixed by a mechanochemical process. An example of the mechanochemical process is the use of a ball mill. The use of a mechanochemical process enables the metal oxide to be deposited on the surface of the silicon oxide, whereby a negative-electrode active material that exhibits an excellent charge-discharge capacity and has excellent charge-discharge efficiency can be produced efficiently.

According to the present invention, it is possible to provide a negative-electrode active material in which an irreversible reaction of $SiO_x$ with conductive ions, such as lithium ions, is prevented. Therefore, the use of the negative-electrode active material of the present invention can improve the charge-discharge efficiency and discharge capacity of a secondary battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 shows a result of powder X-ray diffraction analysis on a negative-electrode active material of Example 1;

DETAILED DESCRIPTION OF EMBODIMENTS

Figure 2:
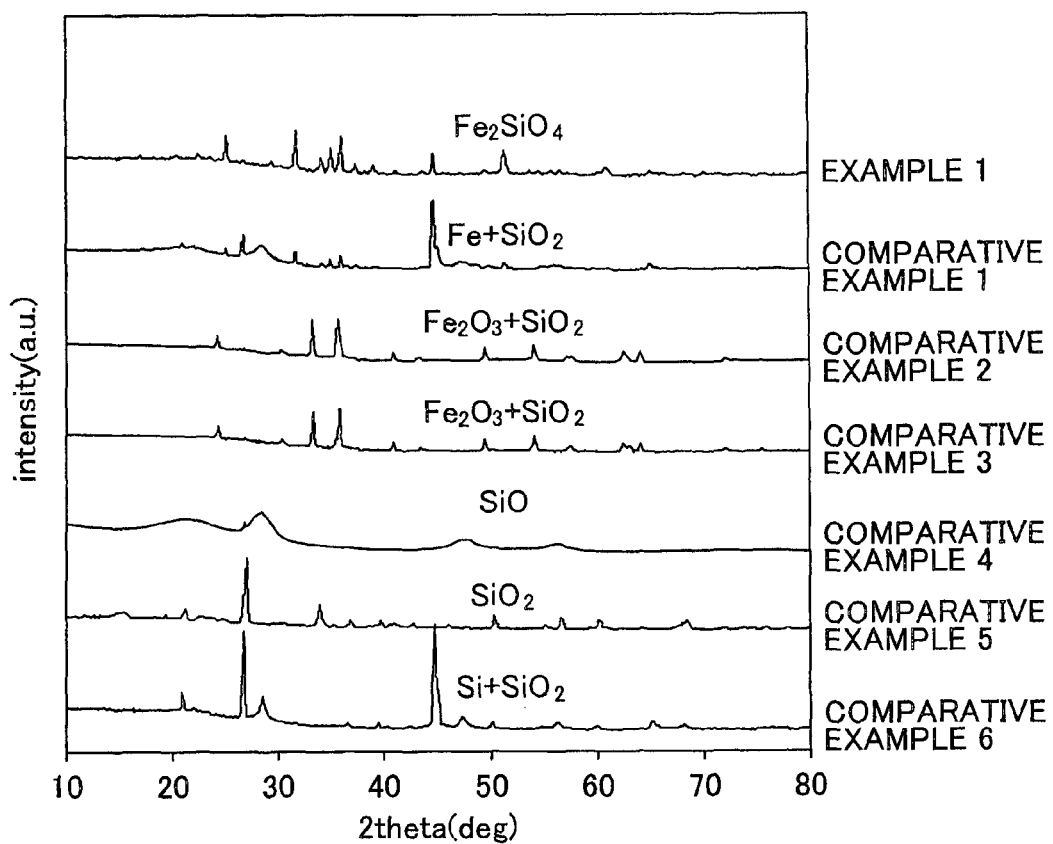
FIG. 2 shows results of powder X-ray diffraction analysis on negative-electrode active materials of Example 1 and Comparative Examples 1 to 6.

Description is hereinafter made of a negative-electrode active material and a method for the production of a negative-electrode active material according to an embodiment of the present invention in detail.

[Negative-electrode active material] A negative-electrode active material of this embodiment contains a silicon oxide that is represented by a general formula $SiO_x (0<x<2)$ and a silicate compound that is represented by a composition formula (1) below.

$$M_a Si_b O_c \cdot m(OH) \cdot n(H_2O) \tag{1}$$

(wherein a, b, c, m and n are respectively in the ranges of $0<a \leq 7$, $0<b \leq 8$, $0<c \leq 22$, $0 \leq m \leq 4$ and $0 \leq n \leq 10$, M contains at least one of Group 3 to 12 transition metal elements in the long-form periodic table and may contain, in addition to the transition metal element, at least one of Group 1 alkali metal elements and Group 2 alkaline-earth metal elements, and Si may be partially substituted by at least one of Al and B).

Silicon (Si), which has a charge-discharge capacity more than ten times that of carbon, which is commonly used as a negative-electrode active material, largely expands and contracts in response to insertion and extraction of conductive ions (lithium ions, for example) during charge and discharge and causes cracks or other damages to the negative-electrode active material layer or layers or members adjacent to the negative-electrode active material layer (Typically, the charge capacity of the negative-electrode active material means the insertion capacity of lithium ions, and the discharge capacity of the negative-electrode active material means the extraction capacity of lithium ions). This is one of causes that affect the durability of the battery. It is, therefore, suggested to use a silicon oxide, such as SiO or $SiO_2$, to reduce expansion and contraction of silicon. It is, however, known a silicon oxide undergoes an irreversible reaction with conductive ions and causes degradation in charge-discharge efficiency or cycle characteristics. For example, it is believed that $SiO_2$ reacts with lithium ions during charge and discharge as follows: $Li + SiO_2 \leftrightarrow Li_{4.4}Si + Li_4SiO_4$ (in this formula, the stoichiometric proportion is not taken into consideration) (The right direction of the reaction formula means the charge. The left direction of the reaction formula means the discharge.) $Li_{4.4}Si$ is formed as a result of reversible insertion of lithium ions into Si, whereas $Li_4SiO_4$ is formed as a result of an irreversible reaction.

The present inventor conducted intensive studies to solve the problem that is caused by the irreversible reaction, and found that the use of a negative-electrode active material that contains a silicon oxide that is represented by a general formula $SiO_x (0<x<2)$ (which may be hereinafter referred to as "silicon oxide $SiO_x$") and a silicate compound, in particular, a silicate compound that is represented by a composition formula (1) above (which may be hereinafter referred to as "silicate compound (1)"), prevents an irreversible side reaction of $SiO_x$ with conductive ions, such as lithium ions. The reason why a negative-electrode active material that contains the silicon oxide $SiO_x$ and the silicate compound (1) can prevent the irreversible side reaction is assumed to be as follows. According to the findings of the present inventor, the irreversible side reaction of the silicon compound $SiO_x$ with conductive ions, such as lithium ions, is triggered by entrance of conductive ions (such as lithium ions) into the Si-defects in the $SiO_4$ tetrahedrons as a basic structure of the silicon compound $SiO_x$. Specifically, when conductive ions enter the Si-defect in an $SiO_4$ tetrahedron, the $SiO_4$ tetrahedron strains (the $SiO_4$ tetrahedron becomes an amorphous structure). Therefore, the $SiO_4$ tetrahedron becomes unbalanced in electric charge. This leads to imbalance in electric charge of $SiO_4$ tetrahedrons in the vicinity of the $SiO_4$ tetrahedron and a change in the bonding force between $SiO_4$ tetrahedrons that are linked with the $SiO_4$ tetrahedron, causing sequential propagation of the irreversible reaction to surrounding $SiO_4$ tetrahedrons. In the embodiment of the present invention, it is assumed that the coexistence of the silicon oxide $SiO_x$ and the silicate compound (1) prevents entrance of conductive ions into Si-defects, leading to effective prevention of the sequential propagation of the irreversible reaction. As described above, the negative-electrode active material of this embodiment, in which an irreversible side reaction of $SiO_x$ with conductive ions is prevented, can improve the charge-discharge efficiency.

The silicon oxide $SiO_x$ and the silicate compound (1) as essential components of the negative-electrode active material of this embodiment are described below.

(Silicon oxide $SiO_x$) The silicon oxide that is contained in the negative-electrode active material of this embodiment, which has a composition that is represented by $SiO_x$ ($0<x<2$), may be composed of a single phase or contain multiple phases. Specifically, the silicon oxide may be composed of a single $SiO_x$ ($0<x<2$) phase or a plurality of $SiO_x$ ($0<x<2$) phases with different x values, or may contain an $SiO_z$ ($0\le z\le 0.8$) phase and an $SiO_v$ ($1.2\le v\le 2$) phase (for example, an Si phase and an $SiO_2$ phase), for example. The phases in the silicon oxide $SiO_x$ may be amorphous or crystalline, or may be a mixture of amorphous and crystalline forms. The silicon oxide $SiO_x$ is preferably free of crystalline $SiO_2$ from the viewpoint of electron conductivity. The silicon oxide $SiO_x$ may have oxygen defects or silicon defects.

In the silicon oxide $SiO_x$, the value of x is preferably in the range of $0.8\le x\le 1.2$ from the viewpoint of irreversible capacity, cycle characteristics and so on.

The silicate compound (1) that is contained in the negative-electrode active material of this embodiment is represented by the composition formula (1) below.

$$M_aSi_bO_c \cdot m(OH) \cdot n(H_2O) \quad (1)$$

(wherein a, b, c, m and n are respectively in the ranges of $0<a\le 7$, $0<b\le 8$, $0<c\le 22$, $0\le m\le 4$ and $0\le n\le 10$, M contains at least one of Group 3 to 12 transition metal elements in the long-form periodic table and may contain, in addition to the transition metal element, at least one of Group 1 alkali metal elements and Group 2 alkaline-earth metal elements, and Si may be partially substituted by at least one of Al and B).

The silicate compound (1), which has a composition that is represented by the composition formula (1), is a compound that contains a transition metal element M, silicon and oxygen and is not a mixture of a silicon oxide and a metal oxide. The fact that the silicate compound (1) is not a mixture can be confirmed by X-ray powder diffraction analysis. The silicate compound (1) may have oxygen defects or metal defects (such as silicon defects or M-defects). The silicate compound (1) is usually crystalline but may be amorphous or a mixture of amorphous and crystalline phases.

In the formula (1), M is preferably a transition metal that belongs to one of the fourth to sixth periods of the periodic table, more preferably a transition metal that belongs to the fourth period. Especially preferred is Fe. M may contain at least one of alkali metals and alkaline-earth metals as long as it contains at least one of transition metal elements in Group 3 to 12, but is preferably free of alkali metal or alkaline-earth metal because they may cause a decrease in electrical conductivity or active material performance.

In the silicate compound (1), the silicon (Si) may be partially substituted by at least one of Al and B. Si can be substituted by other atoms (ions) with an ionic radius or valency close to that of Si ions than Al and B.

In the formula (1), a, b and c depends on the linkage form and so on of the $SiO_4$ tetrahedrons that form the basic skeleton of the silicate compound (1). The $SiO_4$ tetrahedron is a structure which consists of four oxygen atoms at the corners of a tetrahedron and one silicon atom that is surrounded by and covalently bonded to the oxygen atoms. The tetrahedrons exist as separate independent units or share one oxygen atom or a plurality of oxygen atoms with neighboring tetrahedrons, and are bonded to form a chain-like, annular, planar, layered or three-dimensional network structure. In the silicate compound (1), the linkage form of the $SiO_4$ tetrahedrons is not specifically limited. The silicate compound (1) is composed of $SiO_4$ tetrahedrons and cations of the transition metal element M that reside in the spaces between the $SiO_4$ tetrahedrons. Because the skeleton of the silicate compound can be take various forms as described above, the values of a, b and c are not specifically limited as long as they are in the above range.

In this embodiment, the negative-electrode active material contains the silicon oxide $SiO_x$ and the silicate compound. This includes the case where the silicon oxide $SiO_x$ and the silicate compound (1) are in a physically mixed state, the case where one of the silicon oxide $SiO_x$ and the silicate compound (1) is physically coated with the other, the case where one of the silicon oxide $SiO_x$ and the silicate compound (1) is deposited on the surface of the other through chemical bonding, the case where the crystalline or amorphous phase of one of the silicon oxide $SiO_x$ and the silicate compound (1) is trapped in the crystalline or amorphous phase of the other, and the case where the crystalline or amorphous phase of one of the silicon oxide $SiO_x$ and the silicate compound (1) is present on the surface of the crystalline or amorphous phase of the other. This is not intended to exclude the case where a component other than the silicon oxide $SiO_x$ and the silicate compound (1) is contained.

To ensure the prevention of an irreversible reaction of $SiO_x$, the negative-electrode active material of this embodiment is preferably in the form in which the crystalline or amorphous phase of one of the silicon oxide $SiO_x$ and the silicate compound (1) is trapped in the crystalline or amorphous phase of the other or in the form in which the crystalline or amorphous phase of one of the silicon oxide $SiO_x$ and the silicate compound (1) is present on the surface of the crystalline or amorphous phase of the other. Specifically, preferred forms of the negative-electrode active material of this embodiment include a form (A) in which at least one silicate compound phase that contains the silicate compound (1) is present at least in a silicon oxide phase that contains the silicon oxide $SiO_x$, and a form (B) in which a silicate compound phase that contains the silicate compound (1) is present at least on the surfaces of silicon oxide particles that contain the silicon oxide $SiO_x$. Here, each of the silicon oxide phase, the silicate compound phase, and the silicon oxide particles may be amorphous or crystalline. The silicate compound phase may be present both in and on the silicon oxide phase or the silicon oxide particles.

A typical example of the form (A) is a form in which at least one silicate compound phase is present at least in silicon oxide particles that contain the silicon oxide $SiO_x$. In the form (A), the silicate compound phase preferably has a mean diameter of 10 to 2000 nm, more preferably 10 to 500 nm. The term "mean diameter of the silicate compound phase" means the average of the diameters of circles that have the same areas as the projected images of the silicate compound phase particles, and can be obtained by measuring the projected areas of a plurality of silicate compound phase particles under a scanning transmission electron microscope (STEM), for example.

According to the findings of the present inventor, the form (B) is especially preferred in the negative-electrode active material of this embodiment because it is more effective in preventing an irreversible side reaction of the silicon oxide $SiO_x$ with conductive ions (such as lithium ions). The reason is believed to be as follows. The presence of the silicate compound (1) on the surface of the negative-electrode active material is more effective in preventing the entrance of conductive ions into the Si-defects of $SiO_x$ which triggers the irreversible side reaction. Based on this viewpoint, it is especially preferred that the silicate compound phase covers the surfaces of the silicate compound particles. The form (B) is also effective in improving the electron conductivity of the negative-electrode active material.

In the form (B), the silicate compound phase on the surfaces of the silicon oxide particles preferably has a thickness of 10 to 2000 nm, more preferably 10 to 500 nm. A silicate compound phase with a thickness of not smaller than the lower limit improves the effect of the silicate compound (1) in preventing the irreversible side reaction. The thickness of the silicate compound phase on the surfaces of the silicon oxide particles can be measured under a scanning transmission electron microscope (STEM), for example.

The shape of the negative-electrode active material of the present invention is not specifically limited. For example, the negative-electrode active material may be in the form of spherical, fibrous or plate-like particles or aggregates of particles. The size of the negative-electrode active material is not specifically limited. For example, the negative-electrode active material preferably has an average primary particle size of 0.5 μm to 50 μm, more preferably 0.5 μm to 30 μm, when in the form of particles or aggregates of particles. The average primary particle size can be measured under an SEM or by particle size distribution analysis, for example.

The method for the production of the negative-electrode active material of the present invention is not specifically limited. Examples of the method include physically mixing the silicon oxide $SiO_x$ and the silicate compound (1), chemically mixing the silicon oxide $SiO_x$ and the silicate compound (1) by a heat treatment, and electrochemically mixing the silicon oxide $SiO_x$ and the silicate compound (1). Preferred is the use of the method for the production of a negative-electrode active material of this embodiment that is described below.

[Method for production of negative-electrode active material] The method for the production of a negative-electrode active material of this embodiment includes a mixing step of mixing a silicon oxide that is represented by a general formula $SiO_y$ (0<y<2) and a metal oxide, and a heat treatment step of performing a heat treatment on the mixture that is obtained in the mixing step in a non-oxidizing atmosphere. The negative absolute value of the standard Gibbs energy of the oxidation reaction of the metal oxide at the heating temperature in the heat treatment step is smaller than the negative absolute value of the standard Gibbs energy of the oxidation reaction of Si at the heating temperature in the heat treatment step.

A key characteristic of the method for the production of a negative-electrode active material of this embodiment is to perform a heat treatment on a silicon oxide that is represented by a general formula $SiO_y$ (0<y<2) (which may be hereinafter referred to as "silicon oxide $SiO_y$") in the presence of a metal oxide that has a specific standard Gibbs energy as described above (which may be hereinafter referred to "reducing metal oxide") in an non-oxidizing atmosphere. Such a heat treatment can prevent the silicon oxide $SiO_y$ from being oxidized by the oxygen in the heat treatment atmosphere and enables the silicon oxide $SiO_y$ to be oxidized by the metal oxide to form a silicate compound. As a result, a negative-electrode active material that contains the silicon oxide $SiO_x$ and a silicate compound can be obtained. Therefore, according to this embodiment, a negative-electrode active material which has a high capacity that is derived from silicon Si and which is prevented from undergoing an irreversible side reaction with conductive ions can be obtained.

The negative-electrode active material that is produced by the method for the production of a negative-electrode active material of this embodiment typically has a silicon oxide phase that contains a silicon oxide that is represented by a general formula $SiO_x$ (0<x<2) and a silicate compound phase that contains the silicate compound (1). Specifically, a negative-electrode active material in a form (A) in which at least one silicate compound phase that contains the silicate compound (1) is present at least in a silicon oxide phase that contains the silicon oxide $SiO_x$, or a form (B) in which a silicate compound phase that contains the silicate compound (1) is present at least on the surfaces of silicon oxide particles that contain the silicon oxide $SiO_x$ is obtained. It is believed that, in the method for the production of a negative-electrode active material of this embodiment, a negative-electrode active material in which the silicon oxide $SiO_x$ and a silicate compound are mixed at a molecular level as in the form (A) or (B) can be obtained by the following mechanism. It is assumed that the silicon oxide $SiO_y$ as an ingredient has oxygen defects or silicon defects, and, when it is heated in the presence of a reducing metal oxide in a non-oxidizing atmosphere, oxygen atoms or metal atoms of the reducing metal oxide are incorporated into the oxygen defects or silicon defects of the silicon oxide $SiO_y$ to form a silicate compound.

Each step of the method for the production of a negative-electrode active material of this embodiment is described in detail below.

(Mixing step) The mixing step is a step of mixing the silicon oxide $SiO_y$ and a reducing metal oxide.

The silicon oxide $SiO_y$ may be composed of a single phase or contain multiple phases. Specifically, the silicon oxide may be composed of a single $SiO_y$ (0<y<2) phase or a plurality of $SiO_y$ (0<y<2) phases with different y values, or may contain an $SiO_Z$ (0≤z≤0.8) phase and an $SiO_v$ (1.2≤v≤2) phase (for example, an Si phase and an $SiO_2$ phase), for example. The phases in the silicon oxide $SiO_y$ may be amorphous or crystalline, or may be a mixture of amorphous and crystalline forms. The silicon oxide $SiO_y$ may have oxygen defects or silicon defects.

In the silicon oxide $SiO_y$, the value of y is preferably in the range of 0.8≤y≤1.2 from the viewpoint of irreversible capacity, cycle characteristics and so on.

The size of the silicon oxide $SiO_y$ is not specifically limited. For example, the silicon oxide $SiO_y$ preferably has an average particle size of 100 nm to 50 μm, more preferably 100 nm to 30 μm. The term "average particle size" that is used herein means the average particle size of the primary particles of the silicon oxide which can be measured under an SEM or by particle size distribution analysis, for example.

The negative absolute value of the standard Gibbs energy $\Delta G_M$ ($|\Delta G_M|$) of the oxidation reaction of the reducing metal oxide at the heating temperature in the heat treatment step following the mixing step is smaller than the negative absolute value of the standard Gibbs energy $\Delta G_{Si}$ ($|\Delta G_{Si}|$) of the oxidation reaction of silicon (Si) at the heating temperature in the heat treatment step ($|\Delta G_M|<|\Delta G_{Si}|$). In other words, the standard Gibbs energy $\Delta G_M$ of the oxidation reaction of the reducing metal oxide and the standard Gibbs energy $\Delta G_{Si}$ of the oxidation reaction of silicon are both negative values, and the standard Gibbs energy $\Delta G_M$ of the oxidation reaction of the reducing metal oxide has a smaller negative value (a value on the more positive side). A metal oxide that has such a standard Gibbs energy is thermodynamically less stable than silicon under the temperature condition of the heat treatment step and has an ability to oxidize the silicon oxide $SiO_y$ in the non-oxidizing atmosphere of the heat treatment step. In other words, the reducing metal oxide has an ability to provide the silicon oxide $SiO_y$ with oxygen under the temperature condition of the heat treatment step and can also provide the silicon oxide $SiO_y$ with a metal element.

The reducing metal oxide is not specifically limited as long as it has a specific standard Gibbs energy as described above. The reducing metal oxide that can be used in this embodiment can be selected as follows, for example. The standard Gibbs energy $\Delta G_{Si}$ of the oxidation reaction of silicon ($Si+O_2\rightarrow SiO_2$) at the heating temperature in the heat treatment step and the standard Gibbs energy $\Delta G_M$ of the oxidation reaction of a metal oxide at the heating temperature in the heat treatment step are calculated. When the difference between $\Delta G_{Si}$ and $\Delta G_M$ ($\Delta G_{Si}-\Delta G_M$) is a negative value, the metal oxide can be used as the reducing metal oxide. An Ellingham diagram may be used to determine roughly whether a metal oxide can be used as the reducing metal oxide.

Specific examples of the reducing metal oxide include $Fe_2O_3$, $Fe_3O_4$, FeO, $Ti_2O_3$, $Ti_2O$, $Ti_3O_5$, $TiO_2$, CoO, ZnO, $MnO_2$, $Mn_2O_3$, MnO, CuO, $Cu_2O$, NiO, $Nb_2O_3$, $NbO_2$, NbO, $V_2O_5$, $VO_2$, $V_2O_3$, VO, $CrO_2$, $Cr_2O_3$, $WO_3$, $Ag_2O$, $Pt_3O_4$, $Rh_2O_3$, $OsO_2$ and $IrO_3$. Preferred examples of the reducing metal oxide include $Fe_2O_3$, $Fe_3O_4$, FeO, $Ti_2O_3$, $Ti_2O$, $Ti_3O_5$, $TiO_2$, CoO, ZnO, $MnO_2$, $Mn_2O_3$, MnO, CuO, $Cu_2O$, NiO, $Nb_2O_3$, $NbO_2$, NbO, $V_2O_5$, $VO_2$, $V_2O_3$, VO, $CrO_2$, $Cr_2O_3$ and $WO_3$.

The size of the reducing metal oxide is not specifically limited and may be selected as appropriate. For example, the reducing metal oxide preferably has an average particle size of 10 nm to 30 μm, more preferably 10 nm to 5 μm, much more preferably 10 nm to 1 μm. The term "average particle size" that is used herein means the average particle size of the primary particles of the reducing metal oxide which can be measured under an SEM or by particle size distribution analysis.

In the mixing step, the mixing ratio between the silicon oxide $SiO_y$ and the reducing metal oxide is not specifically limited. Preferably, 0.001 to 0.2 mol of the reducing metal oxide is used per mol of the silicon oxide $SiO_y$ because the charge-discharge efficiency can be further improved. Moreover, the use of 0.001 to 0.15 mol of the reducing metal oxide per mol of the silicon oxide $SiO_y$ is more preferred because a decrease in capacity can be reduced, and the use of 0.001 to 0.1 mol of the reducing metal oxide per mol of the silicon oxide $SiO_y$ is much more preferred because a decrease in capacity can be reduced and the charge-discharge efficiency can be improved.

In the mixing step, the reducing metal oxide preferably has an average particle size not greater than that of the silicon oxide $SiO_y$. This is because a negative-electrode active material in the form (B) can be easily obtained when a reducing metal oxide and a silicon oxide $SiO_y$ that have such a size relationship are used as ingredients. It has been confirmed that the use of a negative-electrode active material that is produced from a reducing metal oxide and a silicon oxide $SiO_y$ that have such a size relationship improves the cycle characteristics of the resulting secondary battery. The difference between the average particle sizes of the reducing metal oxide and the silicon oxide $SiO_y$ is not specifically limited as long as the average particle sizes of the reducing metal oxide and the silicon oxide $SiO_y$ are respectively in the ranges that are shown as preferred average particle size ranges in the discussion above.

The method of mixing the reducing metal oxide and the silicon oxide $SiO_y$ in the mixing step is not specifically limited, and the mixing may be achieved by any known means, such as mortar or ball mill. Preferred is the use of a mechanochemical process because the reducing metal oxide can be deposited on the surface of the silicon oxide $SiO_y$ to cover the surface of the silicon oxide $SiO_y$ with the reducing metal oxide. A mechanochemical process applies mechanical energy, such as shear force, impact, compression or friction, by means of grinding in a ball mill, turbo mill or disk mill, sputtering, plating etc. A commercially available product, such as a mechano-fusion system, Nobilta or NanoCreator, manufactured by Hosokawa Micron Corporation, may be used. Above all, the use of a ball mill is preferred. Mixing in a ball mill is usually achieved by putting the reducing metal oxide and the silicon oxide $SiO_y$ as ingredients and media (balls) in a pot and rotating the media. The conditions of the ball mill (such as material and size of the media, rotational speed and processing time) are not specifically limited and may be selected and set as appropriate.

(Heat treatment step) The heat treatment step is a step of performing a heat treatment on the mixture that is obtained in the mixing step in a non-oxidizing atmosphere. The non-oxidizing atmosphere for use in the heat treatment step has only to prevent oxidation of the silicon oxide by the oxygen in the heat treatment atmosphere. Specifically, the non-oxidizing atmosphere needs to have an oxygen partial pressure lower than that in the atmosphere. The non-oxidizing atmosphere may be an inert atmosphere, such as argon gas atmosphere or nitrogen gas atmosphere, a vacuum or a reducing atmosphere, such as hydrogen gas atmosphere. The use of an inert atmosphere is preferred.

The heating temperature in the heat treatment step is not specifically limited but preferably not higher than 1000° C. This is because formation of crystalline $SiO_2$ can be prevented. More preferably, the heating temperature is not higher than 900° C. because a negative-electrode active material in the form (B) can be easily obtained. On the other hand, to react the reducing metal oxide and the silicon oxide $SiO_y$ to form the silicate compound (1), the heating temperature is preferably not lower than 600° C., more preferably not lower than 700° C. The heating period in the heat treatment step may be set as appropriate.

The negative-electrode active material that is provided in this embodiment can be used as a negative-electrode active material for secondary batteries as well as a negative-electrode active material for primary batteries. The secondary batteries include metal secondary batteries other than lithium secondary batteries, but the negative-electrode active material of this embodiment is suitable as a negative-electrode active material for lithium secondary batteries because an irreversible side reaction with lithium ions can be prevented effectively. A lithium secondary battery is taken as an example to describe a secondary battery that uses the negative-electrode active material that is provided in this embodiment.

A lithium secondary battery usually has a structure in which an electrolyte layer is interposed between negative and positive electrodes.

The negative electrode contains a negative-electrode active material which can store and release lithium ions (conductive ions). The negative electrode usually has a negative-electrode active material layer that contains at least a negative-electrode active material, and optionally includes a negative electrode current collector that collects current from the negative-electrode active material layer. As the negative-electrode active material, the negative-electrode active material of this embodiment or a negative-electrode active material that is produced according to the production method of this embodiment may be used.

The negative-electrode active material layer may contain only a negative-electrode active material, or may contain a binder, an electrically conductive material and/or an electrolyte in addition to a negative-electrode active material. For example, when the negative-electrode active material is in the form of a foil, the negative-electrode layer may contain only the negative-electrode active material. When the negative-electrode active material is in the form of a powder, the negative electrode layer may contain a binder in addition to the negative-electrode active material. Examples of the binder include polyvinylidene fluoride (PVDF), polytetrafluoroethylene (PTFE), styrene-butadiene rubber (SBR), polyimide (PI), polyimideamide (PIA), acryl and polyamide. Examples of the electrically conductive material include carbon materials such as carbon black, activated carbon, carbon fibers (e.g., carbon nanotubes and carbon nanofibers) and graphite. As the electrolyte, the same solid electrolyte as described later may be used.

The positive electrode contains a positive-electrode active material that can store and release lithium ions (conductive ions). The positive electrode usually has a positive-electrode active material layer that contains a positive-electrode active material, and optionally includes a positive electrode current collector that collects current from the positive-electrode active material layer. As the positive-electrode active material, any positive-electrode active material that can be used as a positive-electrode active material for a lithium secondary battery is used. Examples of the positive-electrode active material include lithium-transition metal compounds such as lithium nickel-cobalt manganate ($LiNi_xCo_{1-y-x}Mn_yO_2$), lithium cobaltate ($LiCoO_2$), lithium nickelate ($LiNiO_2$), lithium manganate ($LiMnO_2$), iron olivine ($LiFePO_4$), cobalt olivine ($LiCoPO_4$), manganese olivine ($LiMnPO_4$), lithium titanate ($Li_4Ti_5O_p$) and lithium vanadium phosphate ($Li_3V_2(PO_4)_3$), and chalcogen compounds such as copper chevrel ($Cu_2Mo_6S_8$), iron sulfide (FeS), cobalt sulfide (CoS) and nickel sulfide (NiS).

As in the case with the negative-electrode active material layer, the positive-electrode active material layer may contain only a positive-electrode active material or may contain an electrically conductive material a binder, an electrolyte and/or electrode catalyst in addition to a positive-electrode active material. The same electrically conductive material, binder and electrolyte as those for use in the negative-electrode active material layer can be used for the positive-electrode active material and therefore their description is omitted.

The negative-electrode active material layer and the positive-electrode active material layer are formed by applying a slurry that contains the ingredients by a suitable method, such as metal mask printing, electrostatic painting, dip coating, spray coating, roll coating, doctor blade, gravure coating or screen printing, and drying the slurry and optionally rolling the resulting laminate.

The positive electrode current collector and the negative electrode current collector have no limitation on structure, shape and material as long as they are formed of a material that has a desired electron conductivity and does not undergo an alloying reaction with conductive ions in the environment inside a battery (for example, in the case of a lithium ion battery, a material that does not undergo an alloying reaction with Li at an Li reference potential of 0.8 V or lower). Examples of the material for the positive electrode current collector include metal materials such as stainless, nickel, aluminum, iron, titanium and copper, carbon materials such as carbon fibers and carbon paper, and high-electron conductivity ceramic materials such as titanium nitride. The battery case may have a function of the positive electrode current collector. Examples of the material for the negative electrode current collector include copper, stainless, nickel and titanium. The battery case may have a function of the negative electrode current collector. Examples of the form of the positive electrode current collector and the negative electrode current collector include plate, foil and mesh.

The electrolyte layer contains at least an electrolyte that allows conduction of lithium ions (conductive ions) between the positive and negative electrodes. The electrolyte has only to have a lithium ion conductivity. Examples of the electrolyte include electrolytic solution, gel-like electrolyte that is obtained by gelation of an electrolytic solution with a polymer or the like, and solid electrolyte. Examples of the electrolytic solution that has lithium ion conductivity include an electrolytic solution that is obtained by dissolving an electrolyte salt (such as lithium salt) in an aqueous or non-aqueous solvent.

The non-aqueous solvent is not specifically limited, and examples of the non-aqueous solvent include propylene carbonate (PC), ethylene carbonate (EC), vinylene carbonate, dimethyl carbonate (DMC), ethylmethyl carbonate (EMC), diethyl carbonate (DEC), methyl propyl carbonate, isopropiomethyl carbonate, ethyl propionate, methyl propionate, γ-butyrolactone, ethyl acetate, methyl acetate, tetrahydrofuran, 2-methyltetrahydrofuran, ethylene glycol dimethyl ether, ethylene glycol diethyl ether, acetonitrile (AcN), dimethylsulfoxide (DMSO), diethoxyethane and dimethoxyethane (DME). Above all, the use of an aprotic polar solvent, such as AcN, DMSO, PC, EC or DEC, is preferred, and the use of a mixed solvent that contains a high-dielectric cyclic carbonate compound, such as PC or EC, or a chain carbonate, such as DEC or DMC, is more preferred. An ionic liquid may be used as the non-aqueous solvent. Examples of the ionic liquid include N-methyl-N-propylpiperidinium bis(trifluoromethanesulfonyl)amide [abbreviation: PP13-TFSA], and N-methyl-N-propylpyrrolidinium bis(trifluoromethanesulfonyl)amide [abbreviation: P13-TFSA].

Examples of the electrolyte salt include inorganic lithium salts such as $LiPF_6$, $LiBF_4$, $LiClO_4$, $LiAsF_6$, LiOH, LiCl, $LiNO_3$ and $Li_2SO_4$. An organic lithium salt, such as $CH_3CO_2Li$, lithium bis(oxalato)borate (abbreviation: LiBOB), $LiN(CF_3SO_2)_2$ (abbreviation: LiTFSA), $LiN(C_2F_5SO_2)_2$ (abbreviation: LiBETA) or $LiN(CF_3SO_2)(C_4F_9SO_2)$, may be used. The concentration of the lithium salt in the non-aqueous electrolytic solution, which is not specifically limited, is preferably 0.3 mol/L to 5 mol/L, more preferably 1 to 3 mol/L, much more preferably 1 to 2.5 mol/L, especially preferably 0.8 to 1.5 mol/L. When the concentration of the lithium salt is not higher than the upper limit, an excessive increase in viscosity of the electrolytic solution can be prevented and a decrease in discharge capacity during high-rate discharge or in a low-temperature condition can be prevented. On the other hand, when the concentration of the lithium salt is not lower than the lower limit, a sufficient amount of lithium ions is secured and a decrease in discharge capacity during high-rate discharge or in a low-temperature condition can be prevented.

The non-aqueous electrolytic solution may be gelated by addition of a polymer. The gelation of the non-aqueous electrolytic solution may be achieved by adding a polymer, such as polyethylene oxide (PEO), polyacrylnitrile (PAN), polyvinylidene fluoride (PVDF) or polymethylmethacrylate (PMMA), to the non-aqueous electrolytic solution.

Examples of the electrolyte for an aqueous electrolytic solution include LiOH, LiCl, $LiNO_3$, $Li_2SO_4$ and $CH_3COOLi$.

A separator that is impregnated with an electrolytic solution is usually interposed between the positive and negative electrodes. Examples of the separator include an insulating porous body, and examples of the material for the separator include resins, inorganic materials, composites of a plurality of resins, and composites of a resin and an inorganic material. An assembly in which a plurality of separators are stacked may be used.

Examples of the solid electrolyte include inorganic solid electrolytes. Specific examples include oxide-based amorphous solid electrolytes such as $Li_2O$—$B_2O_3$—$P_2O_5$, $Li_2O$—$SiO_2$, $Li_2O$—$B_2O_3$ and $Li_2O$—$B_2O_3$—ZnO; sulfide-based amorphous solid electrolytes such as $Li_2S$—$SiS_2$, LiI—$Li_2S$—$P_2S_5$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, LiI—$Li_3PO_4$—$P_2S_5$ and $Li_2S$—$P_2S_5$; and crystalline oxides and crystalline nitrides such as LiI, LiI—$Al_2O_3$, $Li_3N$, $Li_3N$—LiI—LiOH, $Li_{1.3}Al_{0.3}Ti_{0.7}(PO_4)_3$, $Li_{1+x+y}A_xTi_{2-x}Si_yP_{3-y}O_{12}$ (A=Al or Ga, $0 \leq x \leq 0.4$, $0<y \leq 0.6$), $[(B_{1/2}Li_{1/2})_{1-z}C_z]TiO_3$ (B=at least one that is selected from La, Pr, Nd and Sm, C=Sr or Ba, $0 \leq z \leq 0.5$), $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1) and $Li_{3.6}Si_{0.6}P_{0.4}O_4$. When a solid electrolyte is used, the electrolyte layer may optionally contain, in addition to the solid electrolyte, additional components, such as binder or plasticizer.

The positive electrode, the negative electrode and the electrolyte layer may be accommodated in a battery case. As the battery case, a battery case with any common shape, such as coin, flat plate, cylinder or laminate, may be used. When the battery has a structure in which a plurality of laminates, each of which is formed by stacking the positive electrode, the electrolyte layer and the negative electrode in this order, are stacked on top of one another, separators of an insulating material may be interposed between the positive and negative electrodes. As the separator, a porous film of polyethylene or polypropylene, or an unwoven fabric, such as a resin unwoven fabric or glass fiber unwoven fabric, may be used. The current collector of each electrode may have a terminal as a connector to an external device.

EXAMPLES

Synthesis of Negative-Electrode Active Material

Example 1

Silicon monoxide (SiO) (manufactured by OSAKA. Titanium Technologies, average particle size: 5 μm) and iron oxide ($Fe_2O_3$) (manufactured by C. I. KASEI Co., Ltd., average particle size: 0.039 μm) were mixed in a mortar until a uniform mixture was formed. At this time, 0.125 mol of $Fe_2O_3$ was added per mol of SiO. The mixture was reacted at 1000° C. for three hours in a non-oxidizing atmosphere (argon gas atmosphere). The reaction product was identified in the range of 2θ=10 to 80° at a scanning speed of 10°/min with a powder X-ray diffractometer (manufactured by Rigaku Corporation). The result is shown in FIG. 1 and FIG. 2. As shown in FIG. 1, the reaction product was identified to contain $Fe_2SiO_4$, which indicates that $Fe_2O_3$ as an ingredient was reduced. The TEM-EDX (transmission electron microscopy-energy dispersive X-ray spectrometry) analysis on the reaction product showed that the reaction product contained SiO (0.8<x<1.2) in addition to $Fe_2SiO_4$. Because no peak for SiO was observed in the XRD pattern, the SiO is believed to be amorphous.

Comparative Example 1

A negative-electrode active material was obtained in the same manner as in Example 1 except that silicon (Si) (manufactured by Aldrich, average particle size: 5 μm) was used instead of the silicon monoxide (SiO). The result of powder X-ray diffraction analysis is shown in FIG. 2. Contrary to Example 1, Fe and $SiO_2$ were formed and a composite oxide of Fe and Si was not formed.

Comparative Example 2

A negative-electrode active material was obtained in the same manner as in Example 1 except that silicon dioxide ($SiO_2$) (manufactured by Kojundo Chemical Lab. Co., Ltd., average particle size: 5 μm) was used instead of the silicon monoxide (SiO). The result of powder X-ray diffraction analysis is shown in FIG. 2. Contrary to Example 1, the presence of the ingredients $Fe_2O_3$ and $SiO_2$ was observed, and a composite oxide of Fe and Si (silicate) was not formed.

Comparative Example 3

A negative-electrode active material was obtained in the same manner as in Example 1 except that the reaction atmosphere was ambient atmosphere. The result of powder X-ray diffraction analysis is shown in FIG. 2. Contrary to Example 1, the presence of $Fe_2O_3$ as an ingredient and $SiO_2$ was observed, and a composite oxide of Fe and Si was not formed.

Comparative Example 4

A negative-electrode active material was obtained in the same manner as in Example 1 except that $Fe_2O_3$ was not used. The result of powder X-ray diffraction analysis is shown in FIG. 2. Contrary to Example 1, the presence of an ingredieth SiO was observed, and a composite oxide of Fe and Si was not formed.

Comparative Example 5

A negative-electrode active material was obtained in the same manner as in Example 1 except that $Fe_2O_3$ was not used and the reaction atmosphere was ambient atmosphere. The result of powder X-ray diffraction analysis is shown in FIG. 2. Contrary to Example 1, the formation of $SiO_2$ was observed, but a composite oxide of Fe and Si was not formed.

Comparative Example 6

A negative-electrode active material was obtained in the same manner as in Example 1 except that $Fe_2O_3$ was not used and the reaction temperature was changed to 1300° C. The result of powder X-ray diffraction analysis is shown in FIG. 2. Contrary to Example 1, the presence of Si and $SiO_2$ was observed, and a composite oxide of Fe and Si was not formed.

[Evaluation of Negative-Electrode Active Material] An negative electrode was prepared using each of the negative-electrode active materials that were obtained in Example 1 and Comparative Examples 1 to 6 and evaluated as described below. (Preparation of Negative Electrode) A negative-electrode active material, acetylene black (manufactured by Denki Kagaku Kogyo Kabushiki Kaisha) and a polyamide (manufactured by Toray Industries. Inc.) were mixed at a ratio of 76.5:13.5:10 (weight ratio), and N-methyl-2-pyrrolidone (manufactured by Wako Pure Chemical Industries, Ltd.) as a dispersant and a solvent were added to the mixture to prepare a negative electrode material slurry. The negative electrode material slurry was applied to a copper foil (current collector) by use of a doctor blade, and the copper foil was dried and rolled to obtain a negative electrode in which a negative-electrode active material layer and a negative electrode current collector were stacked.

(Production of Cell for Evaluation) A cell for evaluation was prepared as described below. A foil of lithium metal (manufactured by Honjo Metal Co., Ltd.) was smoothed by means of rollers, and a φ19 mm piece was punched out of the foil to obtain a counter electrode. A lithium salt ($LiPF_6$) was added to a mixed solvent that was obtained by mixing ethylene carbonate (EC) and diethylene carbonate (DEC) at a ratio of 3:7 (volume ratio) to obtain a non-aqueous electrolytic solution with a lithium salt concentration of 1 M. The negative electrode that was prepared as described above, a polypropylene porous film (separator), the counter electrode, and a copper metal foil (counter electrode current collector) were stacked in this order. At this time, the negative electrode was stacked such that the negative-electrode active material layer was on the separator side. The separator of the laminate was impregnated with the electrolytic solution, and the laminate was accommodated in a 2032 coin cell case to obtain a cell for evaluation.

(Evaluation) The charge capacity (mAh/g) and discharge capacity (mAh/g) of each cell for evaluation were measured as described below. The ratio of the discharge capacity to the charge capacity was calculated to obtain the charge-discharge efficiency. The results are summarized in Table 1.

Charge capacity: In a 25° C. environment, Li was inserted at a current value of 0.1 C up to 0.01 V with respect to the counter electrode potential (lithium metal potential), and the charge capacity per gram of the negative-electrode active material was calculated from the total amount of electricity supplied. 1 C is the amount of current that it takes to charge a battery fully in one hour.

Discharge capacity: After the above charging process, in a 25° C. environment, Li was extracted at a current value of 0.1 C up to 2.5 V with respect to the counter electrode potential (lithium metal potential), and the discharge capacity per gram of the negative-electrode active material was calculated from the total amount of electricity supplied.

TABLE 1

|  | Value of $y$ in $SiO_y$ | Addition of reducing metal oxide | Reaction atmosphere | Reaction temperature (° C.) | Charge capacity (mAh/g) | Discharge capacity (mAh/g) | Charge-discharge efficiency (%) |
|---|---|---|---|---|---|---|---|
| Example 1 | 1 | Added | Ar gas | 1000 | 2076 | 1760 | 84 |
| Comparative Example 1 | 0 | Added | Ar gas | 1000 | 872 | 628 | 72 |
| Comparative Example 2 | 2 | Added | Ar gas | 1000 | 1014 | 704 | 69 |
| Comparative Example 3 | 1 | Added | Ambient atmosphere | 1000 | 1523 | 1102 | 72 |
| Comparative Example 4 | 1 | Not added | Ar gas | 1000 | 2497 | 1952 | 77 |
| Comparative Example 5 | 1 | Not added | Ambient atmosphere | 1000 | 2503 | 1714 | 68 |
| Comparative Example 6 | 1 | Not added | Ar gas | 1300 | 2550 | 634 | 25 |

The above results shows that the negative-electrode active material of Example 1, which was prepared by heating and reacting SiO and $Fe_2O_3$ in a non-oxidizing atmosphere (argon gas atmosphere), contains a silicate ($Fe_2SiO_4$) and exhibits a higher charge-discharge efficiency than any of the negative-electrode active materials of Comparative Examples. In Comparative Example 2, the result of evaluation of the charge-discharge performance can be regarded as the result of evaluation of the performance of $Fe_2O_3$ because the $SiO_2$ and $Fe_2O_3$ did not react with each other. In Comparative Example 3, the result of XRD that is shown in FIG. 2 indicates that $SiO_2$ was formed but the results of evaluation of charge and discharge capacities and charge-discharge efficiency that are shown in Table 1 indicate that the negative-electrode active material also contained SiO and its performance was a result of involvement of $Fe_2O_3$ and SiO in the charge and discharge.

Synthesis of Negative-Electrode Active Material

Example 2

Silicon monoxide (SiO) (manufactured by OSAKA Titanium Technologies, average particle size: 5 μm) and iron oxide ($Fe_2O_3$) (manufactured by C. I. KASEI Co., Ltd., average particle size: 30 μm) were mixed in a mortar until a uniform mixture was formed. At this time, 0.125 mol of $Fe_2O_3$ was added per mol of SiO. The mixture was reacted at 600° C. for three hours in a non-oxidizing atmosphere (argon gas atmosphere).

Example 3

A negative-electrode active material was obtained in the same manner as in Example 2 except that the reaction temperature was changed to 700° C.

Example 4

Figure 3:
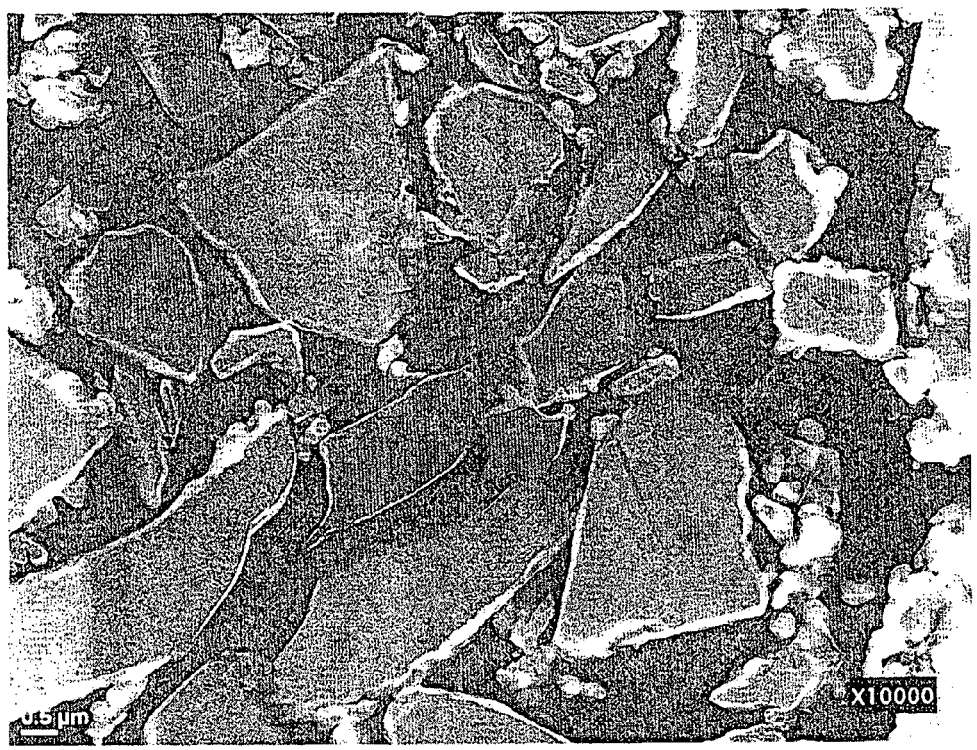
FIG. 3 shows a dark-field STEM image of a negative-electrode active material of Example 4.
Figure 4:
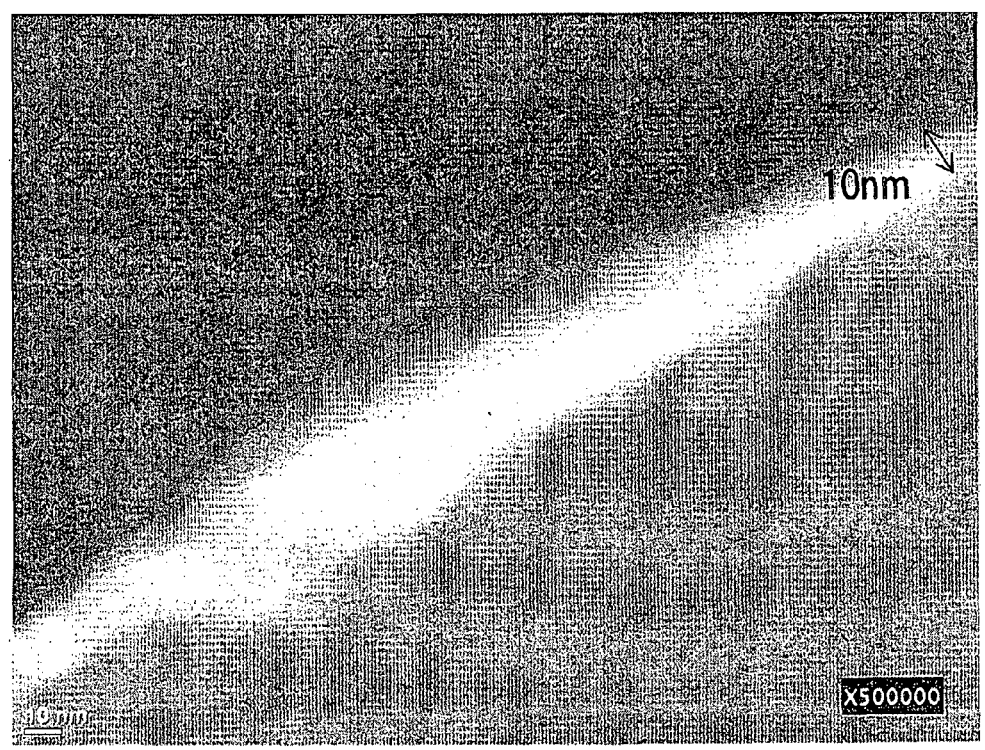
FIG. 4 shows a dark-field STEM image of the negative-electrode active material of Example 4.
Figure 5:
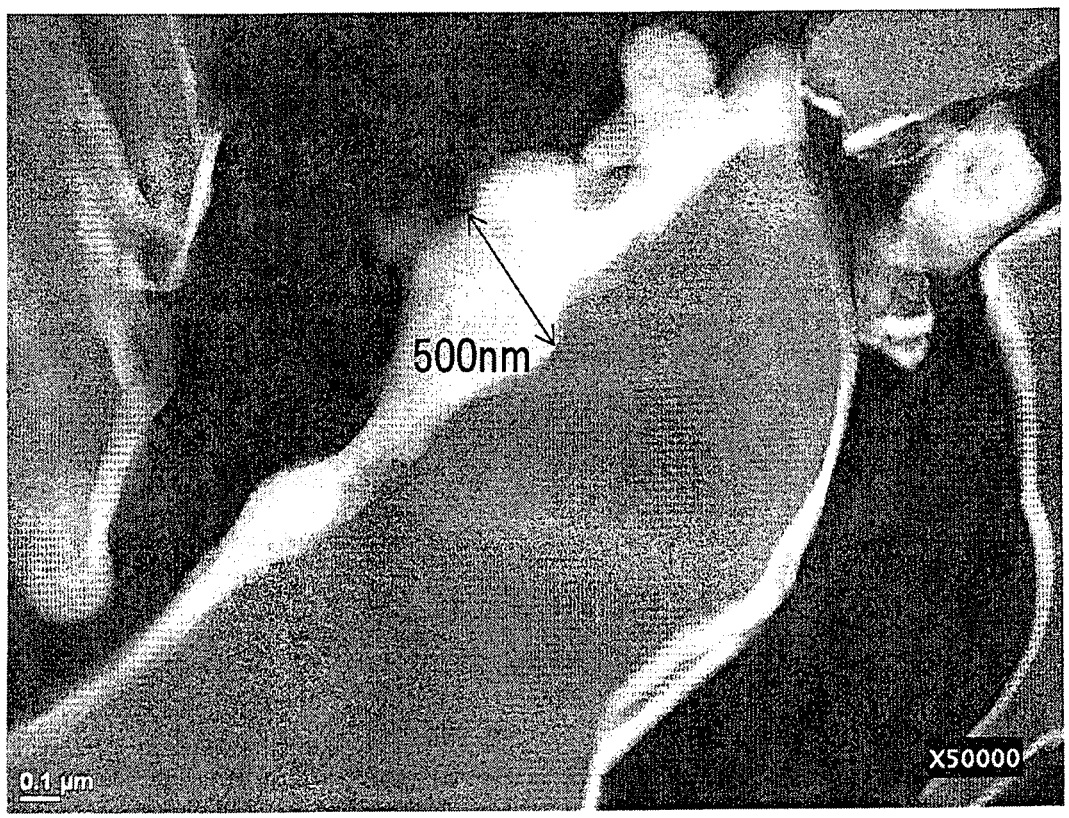
FIG. 5 shows a dark-field STEM image of the negative-electrode active material of Example 4.
Figure 6A:
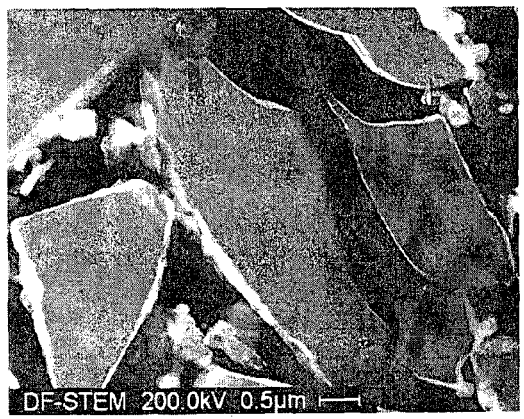
FIG. 6 shows a dark-field STEM image of the negative-electrode active material of Example 4 and results of energy dispersive X-ray spectrometry analysis on the negative-electrode active material of Example 4.
Figure 6B:
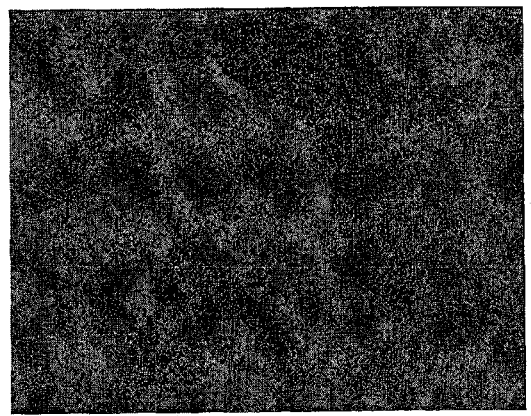
Figure 6C:
Figure 6D:
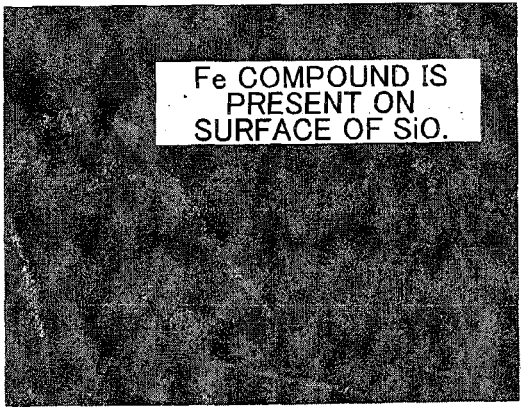

A negative-electrode active material was obtained in the same manner as in Example 2 except that the reaction temperature was changed to 800° C. The form of the negative-electrode active material was observed under a scanning transmission electron microscope (STEM). Dark-field STEM images (DF-STEM) are shown in FIG. 3 to FIG. 5. The gray areas are SiO and the white areas are $Fe_2SiO_4$. STEM observation and energy dispersive X-ray spectrometry (EXD) was performed on the negative-electrode active material to observe the distribution of O, Si and Fe. The results are shown in FIGS. 6A to 6D. FIG. 6A is a DF-STEM image. The whitish areas in FIG. 6B show the distribution of O (oxygen), the whitish areas in FIG. 6C show the distribution of Si (silicon), and the whitish areas in FIG. 6D show the distribution of Fe. The images in FIG. 6 indicate the presence of a Fe compound on the surface of an SiO phase. The images in FIG. 3 to FIG. 6D indicate that an $Fe_2SiO_4$ phase with a thickness of 10 to 500 nm is formed on the surfaces of SiO particles in the negative-electrode active material of Example 4, in which the heat treatment step was carried out at 800° C.

Example 5

A negative-electrode active material was obtained in the same manner as in Example 2 except that the reaction temperature was changed to 900° C.

Example 6

Figure 7:
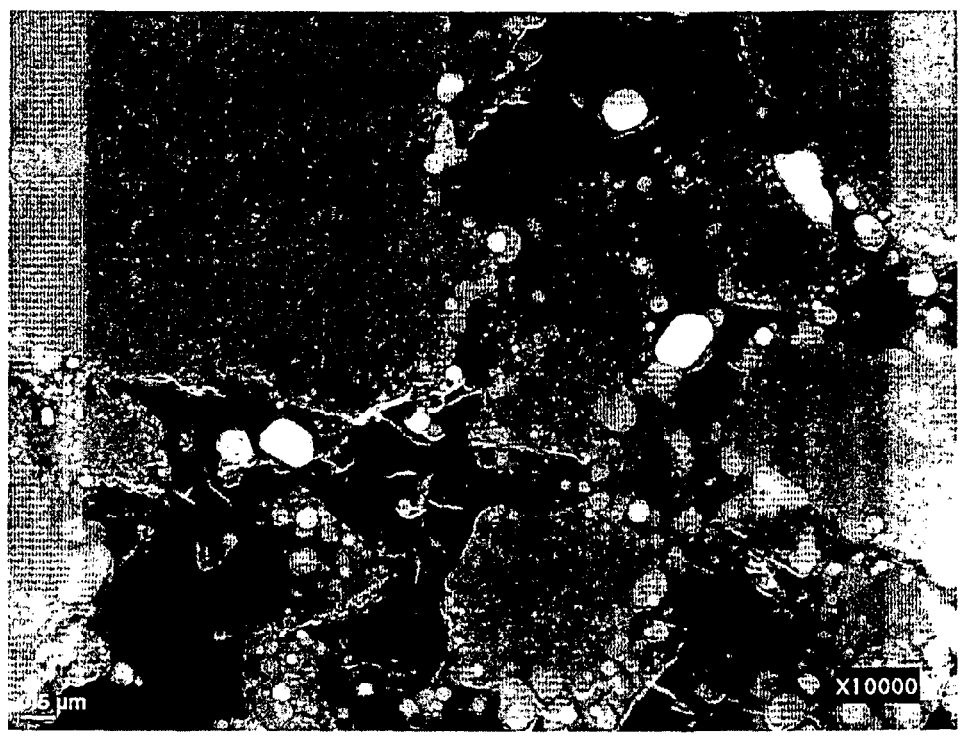
FIG. 7 shows a dark-field STEM image of a negative-electrode active material of Example 6.
Figure 8:
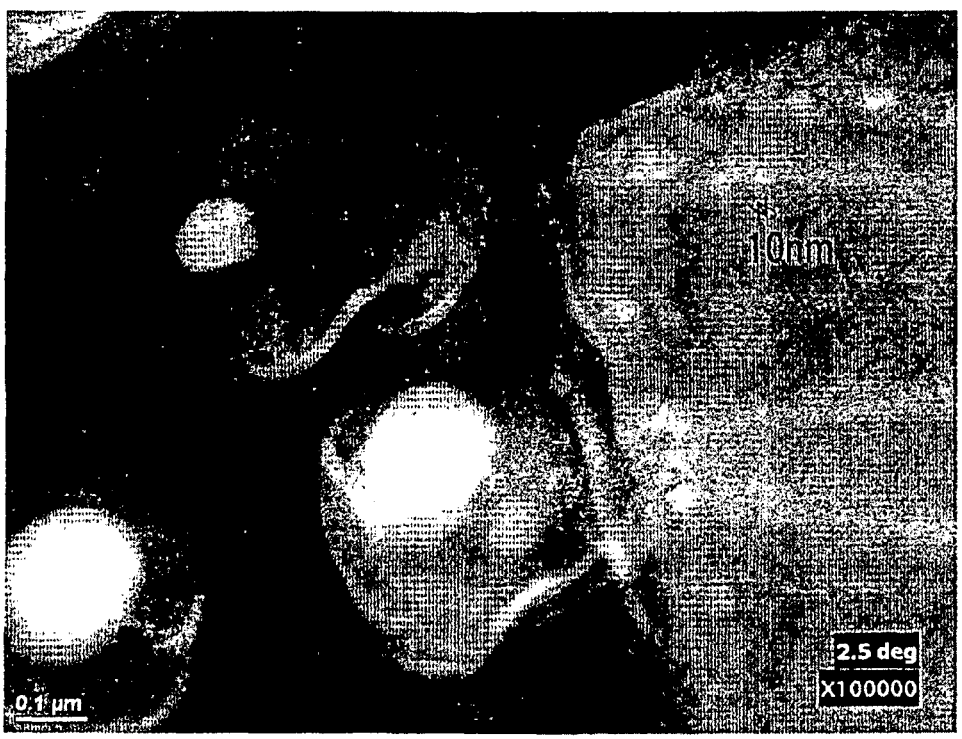
FIG. 8 shows a dark-field STEM image of the negative-electrode active material of Example 6.

A negative-electrode active material was obtained in the same manner as in Example 2 except that the reaction temperature was changed to 1000° C. The form of the negative-electrode active material was observed under a scanning transmission electron microscope (STEM). Dark-field STEM images (DF-STEM) are shown in FIG. 7 and FIG. 8. The gray areas are SiO and the white areas are $Fe_2SiO_4$. The images in FIG. 7 and FIG. 8 indicate that an $Fe_2SiO_4$ phase with an average particle size of 10 nm or greater is formed in SiO particles in the negative-electrode active material of Example 6, in which the heat treatment step was carried out at 1000° C.

Comparative Example 7

A negative-electrode active material was obtained in the same manner as in Example 2 except that $Fe_2O_3$ was not used and the reaction temperature was 0° C., in other word, heating was not carried out.

Comparative Example 8

A negative-electrode active material was obtained in the same manner as in Example 2 except that $Fe_2O_3$ was not used and the reaction temperature was changed to 700° C.

Comparative Example 9

A negative-electrode active material was obtained in the same manner as in Example 2 except that $Fe_2O_3$ was not used and the reaction temperature was changed to 800° C.

Comparative Example 10

A negative-electrode active material was obtained in the same manner as in Example 2 except that $Fe_2O_3$ was not used and the reaction temperature was changed to 900° C.

Comparative Example 11

A negative-electrode active material was obtained in the same manner as in Example 2 except that $Fe_2O_3$ was not used and the reaction temperature was changed to 1000° C.

[Evaluation of Negative-Electrode Active Material] 1.2 Grams of each of the negative-electrode active materials that were obtained in Examples 2 to 6 and Comparative Examples 7 to 11 was weighed out and compressed under a pressure of 20 KN to form a compact. Then, the electric conductivity of the compact was measured. The results are summarized in Table 2. A negative electrode and a cell for evaluation were prepared using each of the negative-electrode active materials that were obtained in Examples 2 to 6 and Comparative Examples 7 to 11, and the charge-discharge efficiency was calculated in the same manner as in Example 1. The results are summarized in Table 2.

TABLE 2

| | Value of $y$ in $SiO_y$ | Addition of reducing metal oxide | Reaction atmosphere | Reaction temperature (° C.) | Electric conductivity (S/cm) | Charge-discharge efficiency (%) |
|---|---|---|---|---|---|---|
| Example 2 | 1 | $Fe_2O_3$ | Ar gas | 600 | $2.25 \times 10^{-9}$ | 74 |
| Example 3 | 1 | $Fe_2O_3$ | Ar gas | 700 | $5.73 \times 10^{-9}$ | 80 |
| Example 4 | 1 | $Fe_2O_3$ | Ar gas | 800 | $8.81 \times 10^{-9}$ | 84 |
| Example 5 | 1 | $Fe_2O_3$ | Ar gas | 900 | $1.12 \times 10^{-10}$ | 77 |
| Example 6 | 1 | $Fe_2O_3$ | Ar gas | 1000 | $7.43 \times 10^{-12}$ | 72 |
| Comparative Example 7 | 1 | Not added | Ar gas | 0 | $2.53 \times 10^{-12}$ | 77 |
| Comparative Example 8 | 1 | Not added | Ar gas | 700 | $2.87 \times 10^{-12}$ | 75 |
| Comparative Example 9 | 1 | Not added | Ar gas | 800 | $2.76 \times 10^{-12}$ | 74 |
| Comparative Example 10 | 1 | Not added | Ar gas | 900 | $3.28 \times 10^{-12}$ | 72 |
| Comparative Example 11 | 1 | Not added | Ar gas | 1000 | $3.78 \times 10^{-12}$ | 70 |

As can be understood from Table 2, when Examples (Examples 3 to 6) and Comparative Examples (Comparative Examples 8 to 11), which are different only in terms of whether or not $Fe_2O_3$ (reducing metal oxide) was used, are compared, the negative-electrode active materials of Examples are all superior in both electric conductivity and charge-discharge efficiency to negative-electrode active materials of corresponding Comparative Examples. A comparison among Examples 2 to 6 shows that a negative-electrode active material which is excellent in both electric conductivity and charge-discharge efficiency can be obtained when the reaction temperature is 600 to 1000° C. A comparison between Examples 4 and 6 shows that a negative-electrode active material in which a silicate compound phase ($Fe_2SiO_4$ phase) is present on the surface of a silicon oxide phase (SiO particles) (Example 4) is superior in charge-discharge efficiency and electrical conductivity to a negative-electrode active material in which a silicate compound phase ($Fe_2SiO_4$ phase) is present in (the bulk of) a silicon oxide phase (SiO particles) (Example 6).

Synthesis of Negative-Electrode Active Material

Reference Experimental Example 1

Figure 9:
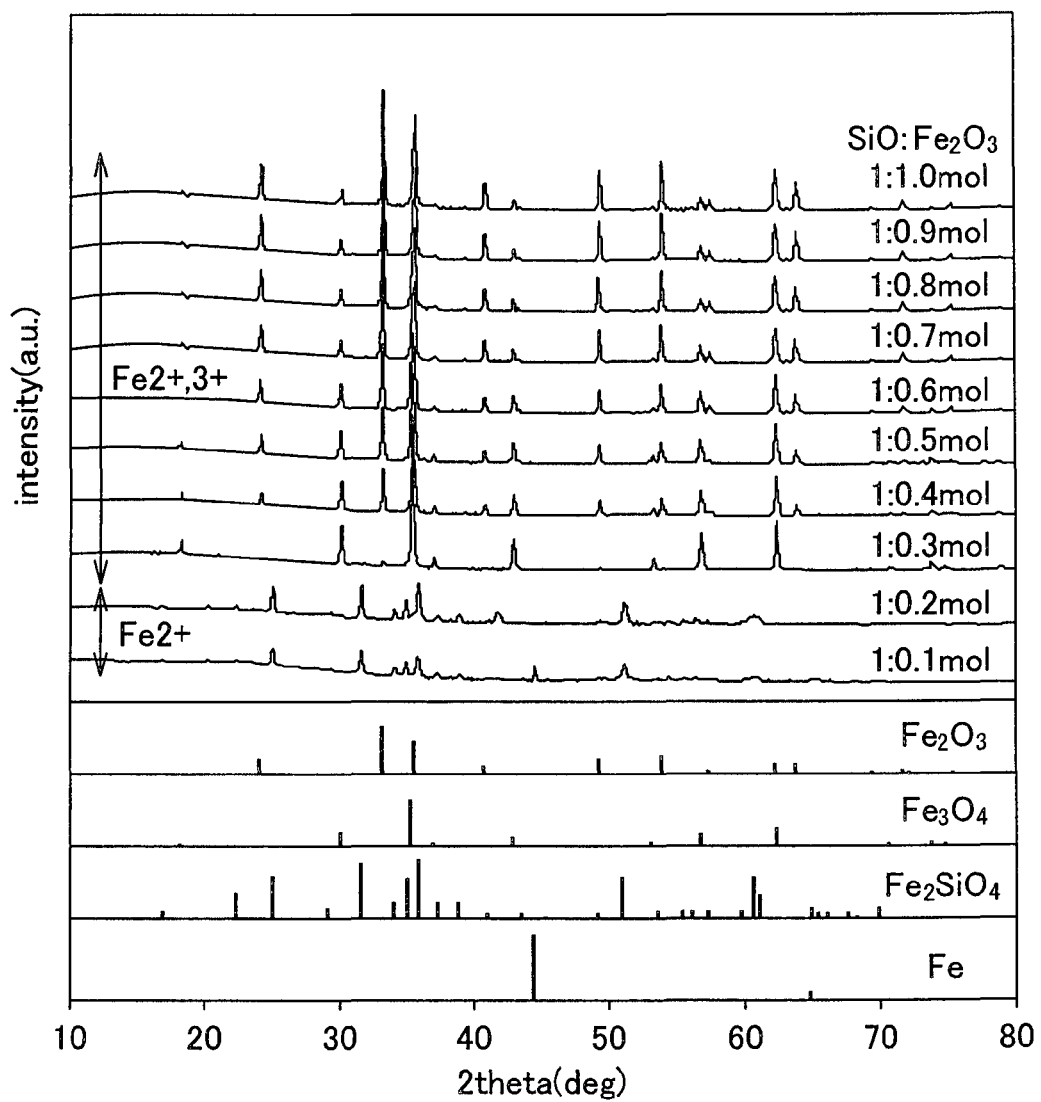
FIG. 9 shows a result of powder X-ray diffraction analysis on a negative-electrode active material of Reference Experimental Example 1.

Silicon monoxide (SiO) (manufactured by OSAKA Titanium Technologies, average particle size: 5 μm) and iron oxide ($Fe_2O_3$) (manufactured by C. I. KASEI Co., Ltd., average particle size: 0.039 μm) were mixed, with the amount of $Fe_2O_3$ per mol of SiO being varied between 0.1 and 1.0 mol, until a uniform mixture was formed. Each mixture was reacted at a heating temperature of 800° C. for three hours in a non-oxidizing atmosphere (argon gas atmosphere). Each reaction product was identified in the range of 2θ=10 to 80° at a scanning speed of 10°/min with a powder X-ray diffractometer (manufactured by Rigaku Corporation). The results are shown: in FIG. 9. As shown in FIG. 9, the presence of unreduced ferric iron was observed when the amount of $Fe_2O_3$ per mol of SiO was 0.3 to 1.0 mol, whereas Fe was reduced to ferrous iron and $Fe_2SiO_4$ was formed when the amount of $Fe_2O_3$ per mol of SiO was 0.1 and 0.2 mol.

Example 7

Silicon monoxide (SiO) (manufactured by OSAKA Titanium Technologies, average particle size: 5 μm) and iron oxide ($Fe_2O_3$) (manufactured by C. I. KASEI Co., Ltd., average particle size: 0.039 μm) were mixed in a mortar until a uniform mixture was formed. At this time, 0.001 mol of $Fe_2O_3$ was added per mol of SiO. The mixture was reacted at 800° C. for three hours in a non-oxidizing atmosphere (argon gas atmosphere).

Example 8

A negative-electrode active material was obtained in the same manner as in Example 7 except that the amount of $Fe_2O_3$ added per mol of SiO was changed to 0.005 mol.

Example 9

A negative-electrode active material was obtained in the same manner as in Example 7 except that the amount of $Fe_2O_3$ added per mol of SiO was changed to 0.025 mol.

Example 10

A negative-electrode active material was obtained in the same manner as in Example 7 except that the amount of $Fe_2O_3$ added per mol of SiO was changed to 0.05 mol.

Example 11

A negative-electrode active material was obtained in the same manner as in Example 7 except that the amount of $Fe_2O_3$ added per mol of SiO was changed to 0.1 mol.

Example 12

A negative-electrode active material was obtained in the same manner as in Example 7 except that the amount of $Fe_2O_3$ added per mol of SiO was changed to 0.15 mol.

Example 13

A negative-electrode active material was obtained in the same manner as in Example 7 except that the amount of $Fe_2O_3$ added per mol of SiO was changed to 0.2 mol.

Example 14

A negative-electrode active material was obtained in the same manner as in Example 7 except that the amount of $Fe_2O_3$ added per mol of SiO was changed to 0.5 mol.

Comparative Example 12

A negative-electrode active material was obtained in the same manner as in Example 7 except that $Fe_2O_3$ was not used.

[Evaluation of Negative-Electrode Active Material] A negative electrode and a cell for evaluation were prepared using each of the negative-electrode active materials that were obtained in Examples 7 to 14 and Comparative Example 12, and the charge capacity, discharge capacity and charge-discharge efficiency were calculated in the same manner as in Example 1. The results are shown in Table 3 and FIG. 10. The relationship between the amount of $Fe_2O_3$ added per mol of SiO and the charge-discharge efficiency is shown in FIG. 11.

TABLE 3

| | Molar ratio between SiO and $Fe_2O_3$ (SiO:$Fe_2O_3$) | Charge capacity (mAh/g) | Discharge capacity (mAh/g) | Charge-discharge efficiency (%) |
|---|---|---|---|---|
| Example 7 | 1:0.001 | 2452 | 2084 | 85 |
| Example 8 | 1:0.005 | 2540 | 2140 | 84 |
| Example 9 | 1:0.025 | 2561 | 2275 | 89 |
| Example 10 | 1:0.05 | 2110 | 1884 | 89 |
| Example 11 | 1:0.1 | 2146 | 1867 | 87 |
| Example 12 | 1:0.15 | 1912 | 1569 | 82 |
| Example 13 | 1:0.2 | 1899 | 1596 | 84 |
| Example 14 | 1:0.5 | 1786 | 1388 | 78 |
| Comparative Example 12 | 1:0 | 2497 | 1925 | 77 |

Figure 10:
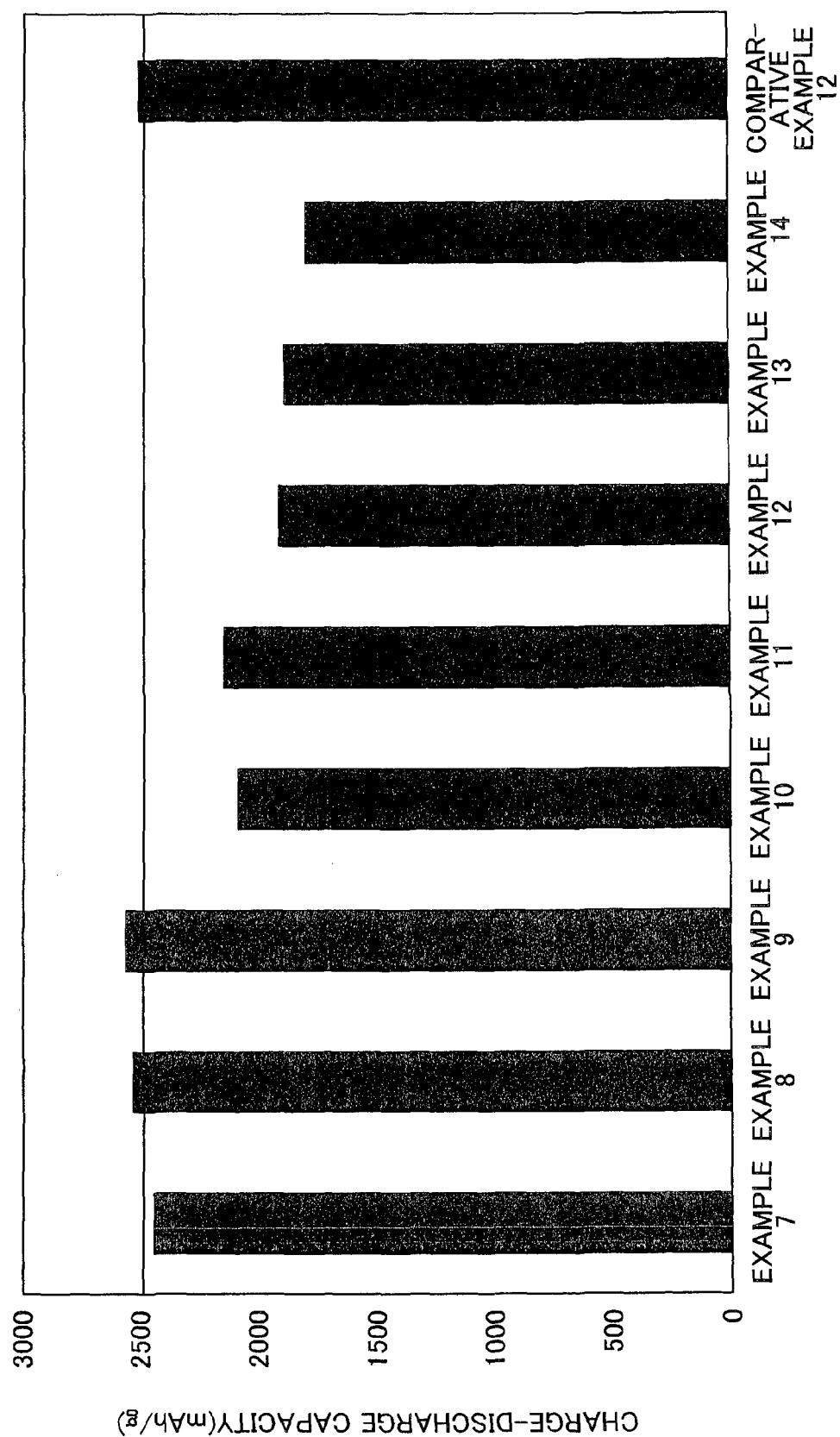
FIG. 10 is a graph that shows the charge-discharge capacities of negative-electrode active materials of Examples 7 to 14 and Comparative Examples 12.
Figure 11:
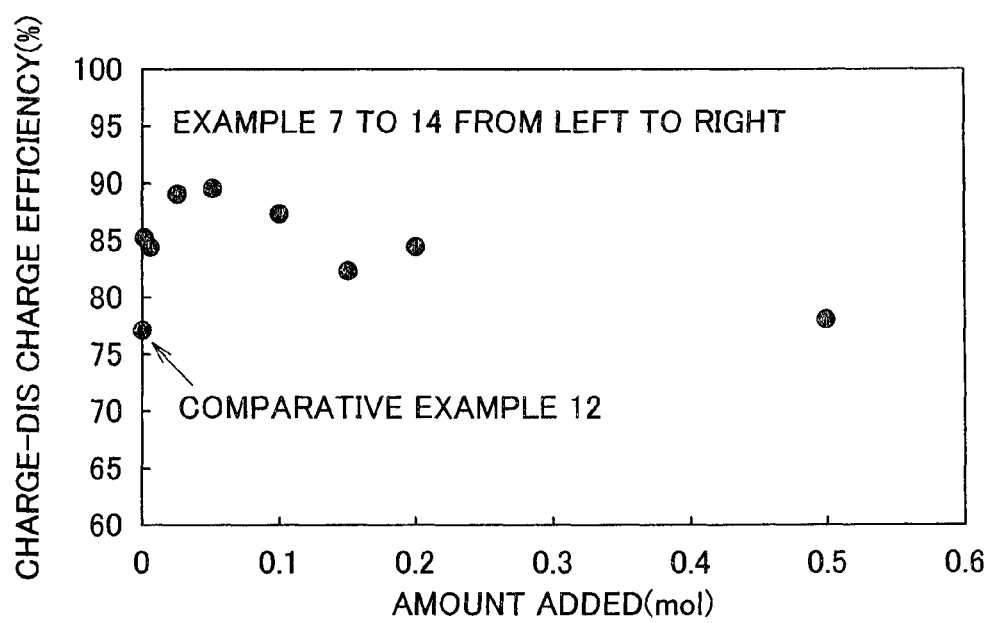
FIG. 11 is a graph that shows the charge-discharge efficiencies of negative-electrode active materials of Examples 7 to 14 and Comparative Examples 12.

As shown in Table 3, FIG. 10 and FIG. 11, the negative-electrode active materials of Examples 7 to 14 are superior in charge-discharge efficiency to the negative-electrode active material of Comparative Example 12. A comparison among the negative-electrode active materials of Examples 7 to 14 shows that a ratio 0.001 to 0.2 mol of $Fe_2O_3$ per mol of SiO is highly effective in improving the charge-discharge efficiency, a ratio of 0.001 to 0.1 mol of $Fe_2O_3$ of per mol of SiO is effective in reducing a decrease in discharge capacity and improving the charge-discharge efficiency, and a ratio of 0.001 to 0.025 mol of $Fe_2O_3$ per mol of SiO is more effective in reducing a decrease in discharge capacity and improving the charge-discharge efficiency.

Synthesis of Negative-Electrode Active Material

Example 15

Silicon monoxide (SiO) (manufactured by OSAKA Titanium Technologies, average particle size: 5 μm) and iron oxide ($Fe_2O_3$) (manufactured by C. I. KASEI Co., Ltd., average particle size: 0.039 μm) were mixed in a mortar until a uniform mixture was formed. At this time, 0.02 mol of $Fe_2O_3$ was added per mol of SiO. The mixture was reacted at 800° C. for three hours in a non-oxidizing atmosphere (argon gas atmosphere).

Example 16

A negative-electrode active material was obtained in the same manner as in Example 15 except that $Fe_2O_3$ with an average particle size of 1 μm was used instead of the $Fe_2O_3$ with an average particle size of 0.039 μm.

Example 17

A negative-electrode active material was obtained in the same manner as in Example 15 except that $Fe_2O_3$ with an average particle size of 5 μm was used instead of the $Fe_2O_3$ with an average particle size of 0.039 μm.

Example 18

A negative-electrode active material was obtained in the same manner as in Example 15 except that $Fe_2O_3$ with an average particle size of 30 μm was used instead of the $Fe_2O_3$ with an average particle size of 0.039 μM.

[Evaluation of Negative-Electrode Active Material] A negative electrode and a cell for evaluation were prepared using each of the negative-electrode active materials that were obtained in Examples 15 to 18 in the same manner as in Example 1. Each cell for evaluation underwent ten charge-discharge cycles under the following conditions, and the rate of the discharge capacity at the tenth cycle to the discharge capacity at the first cycle, which was taken as 100%, (capacity retention rate) was calculated. The results are summarized in Table 4.

Charge: In a 25° C. environment, Li was inserted at a current value of 0.1 C up to 0.01 V with respect to the counter electrode potential (lithium metal potential).

Discharge: After the above charging process, in a 25° C. environment, Li was extracted at a current value of 0.1 C up to 2.5 V with respect to the counter electrode potential (lithium metal potential). At the first and tenth cycles, after the Li extraction process up to 2.5 V, the discharge capacity per gram of the negative-electrode active material was calculated from the total amount of electricity supplied.

TABLE 4

| | SiO particle size (μm) | $Fe_2O_3$ particle size (μm) | $10^{th}/1^{st}$ capacity retention rate (%) |
|---|---|---|---|
| Example 15 | 5 | 0.039 | 95 |
| Example 16 | 5 | 1 | 96 |
| Example 17 | 5 | 5 | 93 |
| Example 18 | 5 | 30 | 90 |

As shown in Table 4, it was proved that excellent cycle characteristics can be achieved when the average particle size of SiO is not smaller than that of $Fe_2O_3$.

Synthesis of Negative-Electrode Active Material

Example 19

Silicon monoxide (SiO) (manufactured by OSAKA Titanium Technologies, average particle size: 5 μm) and iron oxide ($Fe_2O_3$) (manufactured by C. I. KASEI Co., Ltd., average particle size: 0.039 μm) were put in a pot of a ball mill. Zirconia balls with a diameter of 1 mm were also put in the pot of the ball mill. The pot was rotated at a rotational speed of 350 rpm for two hours and then rotated in the opposite direction for another two hours to obtain a uniform mixture. At this time, 0.1 mol of $Fe_2O_3$ was added per mol of SiO. The mixture was reacted at 800° C. for three hours in a non-oxidizing atmosphere (argon gas atmosphere).

[Evaluation of Negative-Electrode Active Material] A negative electrode and a cell for evaluation were prepared using the negative-electrode active materials that was obtained in Example 19 in the same manner as in Example 1. The charge capacity (mAh/g), discharge capacity (mAh/g) and charge-discharge efficiency were calculated. The results are summarized in Table 5. Table 5 also shows the results of Example 11, which is different from Example 19 only in terms of the method of mixing SiO and $Fe_2O_3$ (mixed in a mortar). As shown in Table 5, the negative-electrode active material of Example 19 had a charge capacity of 2072 mAh/g, a discharge capacity of a 2020 mAh/g, and a charge-discharge efficiency of 97.5%. When the results of Example 11, in which a mortar was used, and the results of Example 19, in which a ball mill was used, are compared, the negative-electrode active material of Example 19 had a slightly lower charge capacity but had a higher discharge capacity with a significantly high charge-discharge efficiency of 97.5%. The reasons for the results are believed to be as follows. In Example 19, the silicon monoxide was uniformly coated with the iron oxide because the silicon monoxide and iron oxide were mixed in a ball mill. As a result, a negative-electrode active material in which an $Fe_2SiO_4$ phase (silicate compound phase) was present in larger areas on the surfaces of the silicon monoxide particles was obtained. Thus, the formation of a product resulting from an irreversible reaction of the silicon oxide with lithium ions is prevented, leading to a higher discharge capacity and significant improvement in charge-discharge efficiency compared to the negative-electrode active material of Example 11. The charge capacity of the negative-electrode active material of Example 19 was lower than that of the negative-electrode active material of Example 11. This is believed to be because the charge capacity of the negative-electrode active material of Example 19 was apparently lower than that of the negative-electrode active material of Example 11 by the amount that is derived from a side reaction since a large amount of $Fe_2SiO_4$ phase, which does not undergo a side reaction with lithium ions, was present on the surfaces of the silicon monoxide particles in the negative-electrode active material of Example 19.

TABLE 5

| | Mixing method | Charge capacity (mAh/g) | Discharge capacity (mAh/g) | Charge-discharge efficiency (%) |
|---|---|---|---|---|
| Example 11 | Mortar | 2146 | 1867 | 87 |
| Example 19 | Ball mill | 2072 | 2020 | 97.5 |

The invention claimed is:

1. A negative-electrode active material, comprising:
    a silicon oxide that is represented by a general formula $SiO_x$ (0<x<2), and
    a silicate compound that is represented by $M_aSi_bO_c \cdot m(OH) \cdot n(H_2O)$,
    wherein a, b, c, m and n are respectively in the ranges of 0<a≤7, 0<b≤8, 0<c≤22, 0≤m≤4 and 0≤n≤10, M contains at least one of Group 3 to 12 transition metal elements in the long-form periodic table.

2. The negative-electrode active material according to claim 1, wherein x in the general formula $SiO_x$ is in a range of 0.8≤x≤1.2.

3. The negative-electrode active material according to claim 1, wherein at least one silicate compound phase that contains the silicate compound is present at least in a silicon oxide phase that contains the silicon oxide.

4. The negative-electrode active material according to claim 3, wherein the silicate compound phase has a mean diameter of 10 to 2000 nm.

5. The negative-electrode active material according to claim 1, wherein a silicate compound phase that contains the silicate compound is present at least on surfaces of silicon oxide particles that contain the silicon oxide.

6. The negative-electrode active material according to claim 5, wherein the silicate compound phase that is present on the surfaces of the silicon oxide particles has a thickness of 10 to 2000 nm.

7. A production method for the negative-electrode active material that is the negative-electrode active material according to claim 1, comprising:
   a mixing step of mixing a silicon oxide that is represented by a general formula $SiO_y$ (0<y<2) and a metal oxide to obtain a mixture, and
   a heat treatment step of performing a heat treatment on the mixture in a non-oxidizing atmosphere,
   wherein a negative absolute value of the standard Gibbs energy of the oxidation reaction of the metal oxide at a heating temperature in the heat treatment step is smaller than the negative absolute value of the standard Gibbs energy of the oxidation reaction of Si at the heating temperature in the heat treatment step.

8. The production method according to claim 7, wherein y in the general formula $SiO_y$ is in a range of $0.8 \leq y \leq 1.2$.

9. The production method according to claim 7, wherein the heat treatment is carried out at a temperature of 600° C. to 1000° C. in an inert atmosphere in the heat treatment step.

10. The production method according to claim 7, wherein the heat treatment is carried out at a temperature of 700° C. to 900° C. in the heat treatment step.

11. The production method according to claim 7, wherein 0.001 to 0.2 mol of the metal oxide is added per mol of the silicon oxide in the mixing step.

12. The production method according to claim 7, wherein the metal oxide has an average particle size which is equal to or smaller than that of the silicon oxide in the mixing step.

13. The production method according to claim 7, wherein the metal oxide is deposited on a surface of the silicon oxide in the mixing step.

14. The production method according to claim 7, wherein the silicon oxide and the metal oxide are mixed by a mechanochemical process in the mixing step.

15. The production method according to claim 14, wherein the mechanochemical process is carried out in a ball mill.

16. The negative-electrode active material according to claim 1, wherein M contains, in addition to the transition metal element, at least one of Group 1 alkali metal elements and Group 2 alkaline-earth metal elements.

17. A negative-electrode active material, comprising:
   a silicon oxide that is represented by a general formula $SiO_x$, $0 \leq x \leq 2$, and
   a silicate compound that is represented by $M_a Si_b O_c \cdot m(OH) \cdot n(H_2O)$,
   wherein a, b, c, m and n are respectively in ranged of $0 < a \leq 7$, $0 < b \leq 8$, $0 < c \leq 22$, $0 \leq m \leq 4$ and $0 \leq n \leq 10$, M contains at least one of Group 3 to 12 transition metal elements in the long-form periodic, and Si is partially substituted by at least one of Al and B.

18. The negative-electrode active material according to claim 17, wherein M contains, in addition to the transition metal element, at least one of Group 1 alkali elements and Group 2 alkaline-earth metal elements.

* * * * *